(12) United States Patent
Shugrina et al.

(10) Patent No.: US 10,347,012 B2
(45) Date of Patent: Jul. 9, 2019

(54) INTERACTIVE COLOR PALETTE INTERFACE FOR DIGITAL PAINTING

(71) Applicant: Adobe Inc., San Jose, CA (US)

(72) Inventors: Maria Shugrina, Toronto (CA);
Stephen J. DiVerdi, Oakland, CA (US);
Jingwan Lu, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 4 days.

(21) Appl. No.: 15/589,223

(22) Filed: May 8, 2017

(65) Prior Publication Data

US 2018/0322661 A1    Nov. 8, 2018

(51) Int. Cl.
  *G06T 11/00* (2006.01)
  *G06T 11/40* (2006.01)
  *G06F 3/0488* (2013.01)

(52) U.S. Cl.
  CPC .......... *G06T 11/001* (2013.01); *G06F 3/0488* (2013.01); *G06F 3/04883* (2013.01); *G06T 2200/24* (2013.01)

(58) Field of Classification Search
  None
  See application file for complete search history.

(56) References Cited

U.S. PATENT DOCUMENTS

| 8,487,963 B1* | 7/2013 | Harris ..................... G06T 11/00 345/619 |
| 9,147,378 B2 | 9/2015 | Shekey |
| 2007/0008560 A1* | 1/2007 | Eschbach ............. H04N 1/6011 358/1.9 |
| 2012/0099784 A1* | 4/2012 | Marchesotti ......... G06K 9/4652 382/162 |
| 2014/0111539 A1* | 4/2014 | Allen .................... G06T 11/001 345/594 |
| 2014/0237429 A1* | 8/2014 | Abrahami ............. G06T 11/001 715/835 |

OTHER PUBLICATIONS

Peter Vandoren et al., "IntuPaint: Bridging the Gap Between PHysical and Digital Painting", IEEE, 2008, pp. 55-72.
(Continued)

*Primary Examiner* — Tize Ma
(74) *Attorney, Agent, or Firm* — Finch & Maloney PLLC

(57) ABSTRACT

An interactive palette interface includes a color picker for digital paint applications. A user can create, modify and select colors for creating digital artwork using the interactive palette interface. The interactive palette interface includes a mixing dish in which colors can be added, removed and rearranged to blend together to create gradients and gamuts. The mixing dish is a digital simulation of a physical palette on which an artist adds and mixes various colors of paint before applying the paint to the artwork. Color blobs, which are logical groups of pixels in the mixing dish, can be spatially rearranged and scaled by a user to create and explore different combinations of colors. The color, position and size of each blob influences the color of other pixels in the mixing dish. Edits to the mixing dish are non-destructive, and an infinite history of color combinations is preserved.

20 Claims, 14 Drawing Sheets
(7 of 14 Drawing Sheet(s) Filed in Color)

(56) References Cited

OTHER PUBLICATIONS

Ghita Jalal et al., "Color Portraits: From Color Picking to Interacting with Color", Proceedings of the ACM International Conference on Human Factors in Computing Systems, 2015, 11 pgs.

Bill Baxter et al., "DAB: Interactive Haptic Painting with 3D Virtual Brushes", Proceedings of the 28th Annual Conference on Computer Graphics and Interactive Techniques, 2001, 8 pages.

Barbara J. Meier et al., "Interactive Color Palette Tools", IEEE Computer Society, May/Jun. 2004, pp. 64-72.

\* cited by examiner

FIG. 3A  FIG. 3B  FIG. 3C
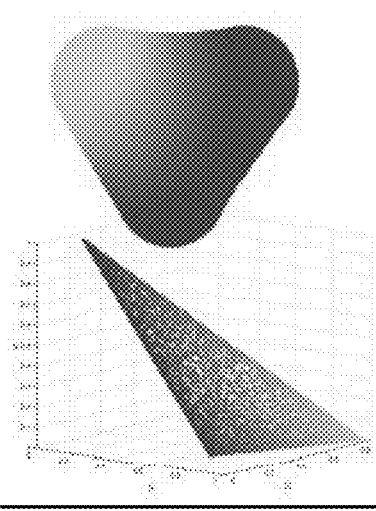 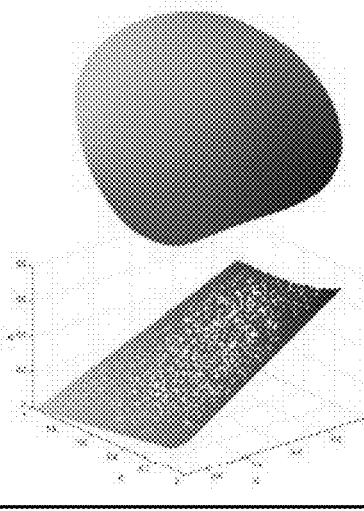 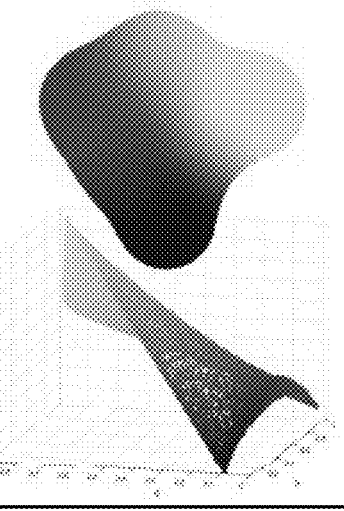
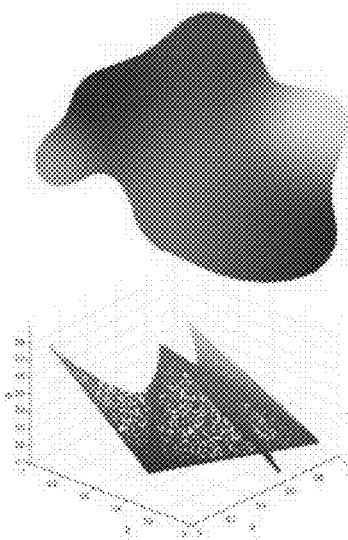 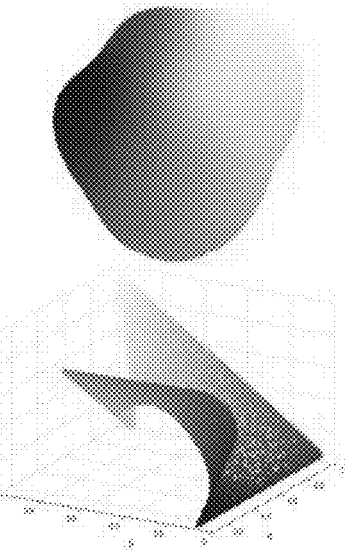 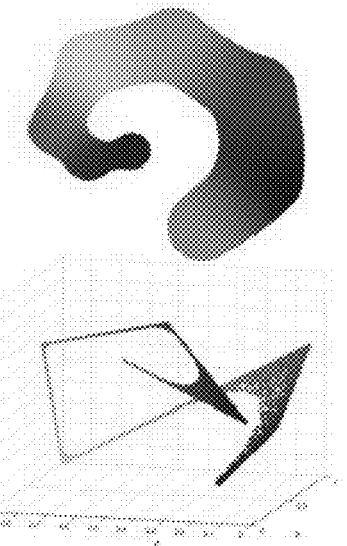
FIG. 3D  FIG. 3E  FIG. 3F Tap to add color to mixing dish Drag color within mixing dish to change effect on blob

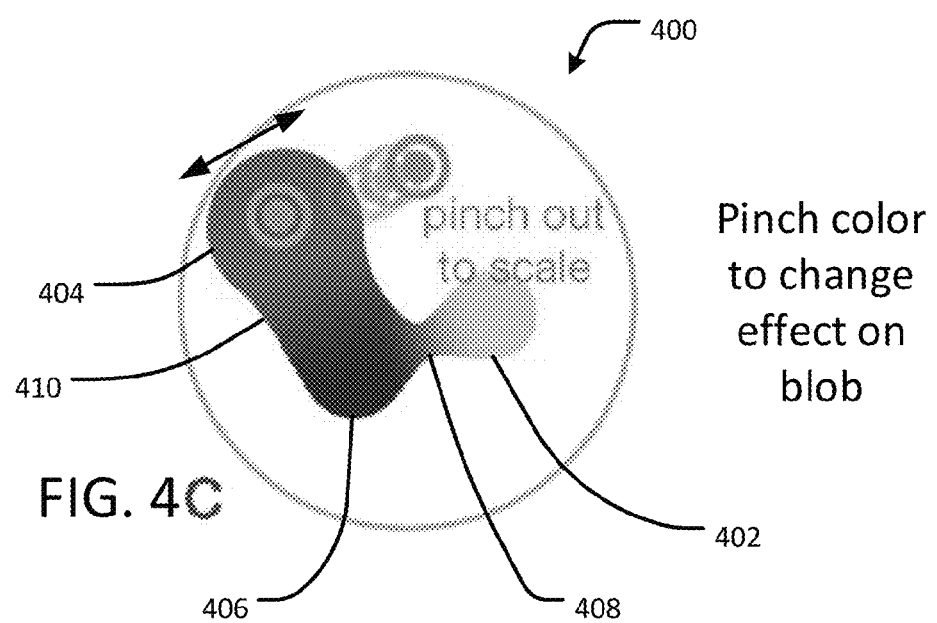

Touch blob
to select
color while
painting

Double tap to change blob color

Select color from blob while painting

US 10,347,012 B2

INTERACTIVE COLOR PALETTE INTERFACE FOR DIGITAL PAINTING

FIELD OF THE DISCLOSURE

This disclosure relates generally to digital image processing, and more particularly, to techniques for creating, modifying and selecting colors for digital artwork using an interactive palette interface.

BACKGROUND

Certain interaction modalities, such as tablets and styluses, provide a natural interface for artists using digital painting applications. For selecting color, some existing digital painting tools utilize a color picker interface that was designed decades ago. However, the existing color picker fulfills only a fraction of the functionality of a traditional artist's palette, which is a fundamental tool for painting with physical media. The traditional palette is typically a rigid, flat surface on which a painter arranges and mixes paints having various colors. The traditional palette is not only used for easy access to colors, but also allows an artist to create a custom view of the color space that is specific to the artwork. Additionally, the traditional palette allows an artist to easily access previously mixed colors. Furthermore, the ability to use the traditional palette to mix colors affords a way to create related harmonies, such as the color of an orange reflected in the blue surface of the vase. The traditional palette also affords an artist an ability to explore and play around with color, and to plan a color gamut for an entire artwork. However, these complex interactions, which are integral to the creative painting process with traditional media, have not been replicated by existing digital painting tools.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are not intended to be drawn to scale. In the drawings, each identical or nearly identical component that is illustrated in various figures is represented by a like numeral.

FIGS. 3A-3F show several other example interactive palette interfaces, in accordance with embodiments of the present disclosure.

FIGS. 4A-4F show various interactive editing functions of an example mixing dish in an interactive palette interface, in accordance with an embodiment of the present disclosure.

DETAILED DESCRIPTION

Overview

Figure 1:
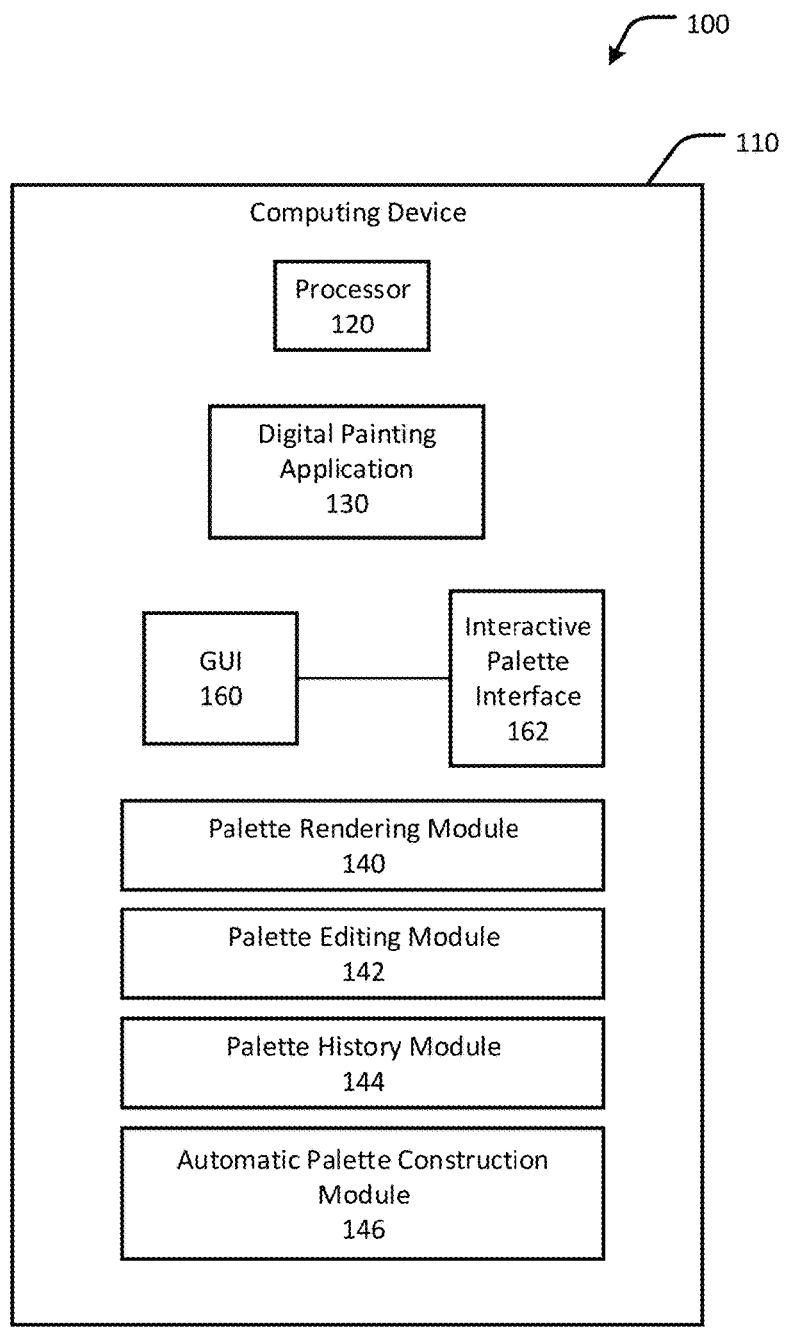
FIG. 1 shows an example system for digital painting using an interactive palette interface, in accordance with an embodiment of the present disclosure.

In the physical realm, a traditional paint palette provides a surface for arranging and mixing paint. Traditional palettes allow artists to add an element of serendipity to the color mixing process, but at the same time make selecting a specific color more difficult due to the limitations of mixing paints. For instance, some colors, once mixed together, obtain hues that are difficult to enhance or eliminate, forcing the artist to start the mixing process again with fresh paint. A common example is adding black paint to white paint, after which it is nearly impossible to reobtain the original hue of the white paint. Traditional palettes also allow artists to arrange colors around the palette as they please. Such a spatial arrangement of colors on the palette presents the entire color gamut simultaneously, which then allows harmonization by adding a new color, for example, a dab of red, to all the colors on the palette. However, once the colors are arranged, the palette cannot be rearranged, causing it to become messy over time. Physical palettes have the drawbacks of physical media, such as the inability to revert to an earlier color—once a mixed paint color runs out, it can be very difficult to reproduce. Furthermore, physical palettes do not permit non-destructive editing (changing of colors), which limits artist experimentation and reversal of mistakes. This may cause artists to be more conservative with their exploration than they would if non-destructive editing was possible. For these reasons, simply emulating the physical palette with a digital version is not the best design to support artists' color needs.

In the digital realm, some existing digital color pickers may satisfy preferences of the artist that are not possible with the traditional paint palette. For instance, some existing digital color pickers provide mechanisms for selecting a color, such as an interactive color wheel. Such existing color pickers also support color histories and swatch palettes, and independently of the color picker interface by the eye dropper tool common to paint programs (which enables sampling a color from the canvas). However, such existing color pickers lack other capabilities, such as mixing and harmonizing colors in relation to other colors, exploring and experimenting with different color combinations, and organizing colors in a graphical interface using a color gamut layout. Some artists employ workarounds to achieve these missing capabilities, such as using a swatch palette to organize a color gamut, but because the existing interfaces are not designed for such uses, they are brittle and cumbersome.

To this end, techniques are provided for digital painting using an interactive palette interface that incorporates certain features of traditional paint palettes into the digital realm and also improves upon some existing digital color pickers. According to an embodiment of the present disclosure, a user can create, modify and select colors for creating digital artwork using the interactive palette interface. The interactive palette interface includes a mixing dish in which colors can be added, removed and rearranged to blend together to create gradients and gamuts. The mixing dish is a digital simulation of a physical palette on which an artist adds and mixes various colors of paint before applying the paint to the artwork. Color blobs, which are logical groups of pixels in the mixing dish, can be spatially rearranged and scaled by a user to create and explore different combinations of colors. The color, position and size of each color blob influences the color of other pixels in the mixing dish. Edits to the mixing dish are non-destructive, and potentially unlimited history of color combinations is preserved, allowing the user to recall and modify previously created color combinations. In some embodiments, the mixing dish can be automatically created or modified by reproducing colors from an existing digital artwork instead of, or in addition to, colors manually created by the user.

In accordance with an embodiment of the present disclosure, a parametric palette interface is provided that addresses limitations of some existing color palettes in both the physical and digital realms. The palette interface is easy and intuitive to use, fast to render, and compact to store. The representation is generalizable to other digital color operations and physical color models, and supports full history tracking. The design provides the following capabilities while avoiding many shortcomings of the traditional palette: creating and selecting colors; accessing previously created colors; creating (harmonizing) colors related to other colors; laying out a gamut of colors to use for an artwork, including shades and tones; and exploring different color combinations as part of the creative process. The disclosed techniques are particularly useful in situations where a seamless experience with natural tools for working with color can encourage people to paint in the digital realm, and afford existing digital artists new degrees of creative freedom. Such an interactive palette interface combines features of physical and digital palettes. For example, a color picker for digital painting applications, in accordance with an embodiment, includes an intuitive interface for artists familiar with traditional oil paint and watercolor media.

System Architecture

FIG. 1 shows an example system 100 for digital painting using an interactive palette interface, in accordance with an embodiment of the present disclosure. The system 100 includes a computing device 110 having a processor 120, a digital painting application 130, and a graphical user interface (GUI) 160 that includes an interactive palette interface 162. The computing device 110 is configured to execute a palette rendering module 140, a palette editing module 142, a palette history module 144, and an automatic palette construction module 146.

As described in further detail below with respect to, for example, FIGS. 2, 3A-3F, 4A-4F, 5, 6, 7, 8, 9 and 10, the palette rendering module 140 is generally configured to assign attributes to one or more pixel groups, or color blobs, rendered in a graphical user interface (GUI) of the computing device 110, calculate a color of at least one other pixel in the GUI as a parametric function of the pixel group attributes, and render the pixels in the GUI. As will be understood, a "pixel" as used in this disclosure includes a physical point in an image presented by a digital or electronic display or printer device. The attributes include the color, position and size of the pixel groups. The palette editing module 142 is generally configured to receive an input representing a modification of the color, position, or size of one or more of the pixel groups, update the color of one or more other pixels in the GUI using the parametric function, and render the updated pixels in the GUI. The palette history module 144 is generally configured to store one or more of the attributes of the pixel groups prior to modification of the attributes such that the attributes, once modified, can be reverted to the stored values in response to a user input. The automatic palette construction module 146 is generally configured to convert one or more colors from an existing digital artwork into an interactive palette interface.

Example Parametric Palette Interface

In accordance with an embodiment, a palette P for a given artwork is represented as a set of mixing dishes $D_1 \ldots D_n$, where each mixing dish is a set of color blobs $B_i$. Each blob $B_i$ is a tuple of attributes $\{c_i, p_i, r_i, m_i\}$ containing color vector $c_i$ in a chosen color space $\mathbb{K}$ (e.g., sRGB), position $p_i$ in $\mathbb{A}^2$, a continuous subset of $\mathbb{R}^2$ (e.g., the area defined by the unit circle), radius $r_i$, and an optional metadata vector $m_i$. In some embodiments, the attributes represent one or more user inputs, received by a client device, each corresponding to a selection of a color blob, a position of the color blob within the mixing dish and relative to any other color blobs, and a size of the color blob. Any or all of the attributes can be controlled by the user via an interactive palette interface provided by the client device. A family of continuous, smooth functions $F(p, r) \to (\mathbb{A}^2 \to \mathbb{R}_+)$ is defined, where each function defines a local area of influence of each blob on the color of other pixels in the mixing dish so as to produce a gradient of colors in the palette between or otherwise proximate to the color blobs. The position and radius parameters of each blob $B_i$ implicitly define its influence function $M_i := F(p_i, r_i)$ over the domain $\mathbb{A}^2$. In some cases, a variant of the metaball function is used, which is a Gaussian approximation with finite extent, and a quadratic radius transform is applied to ensure equal influence margin for blobs of variable radius.

Figure 2:
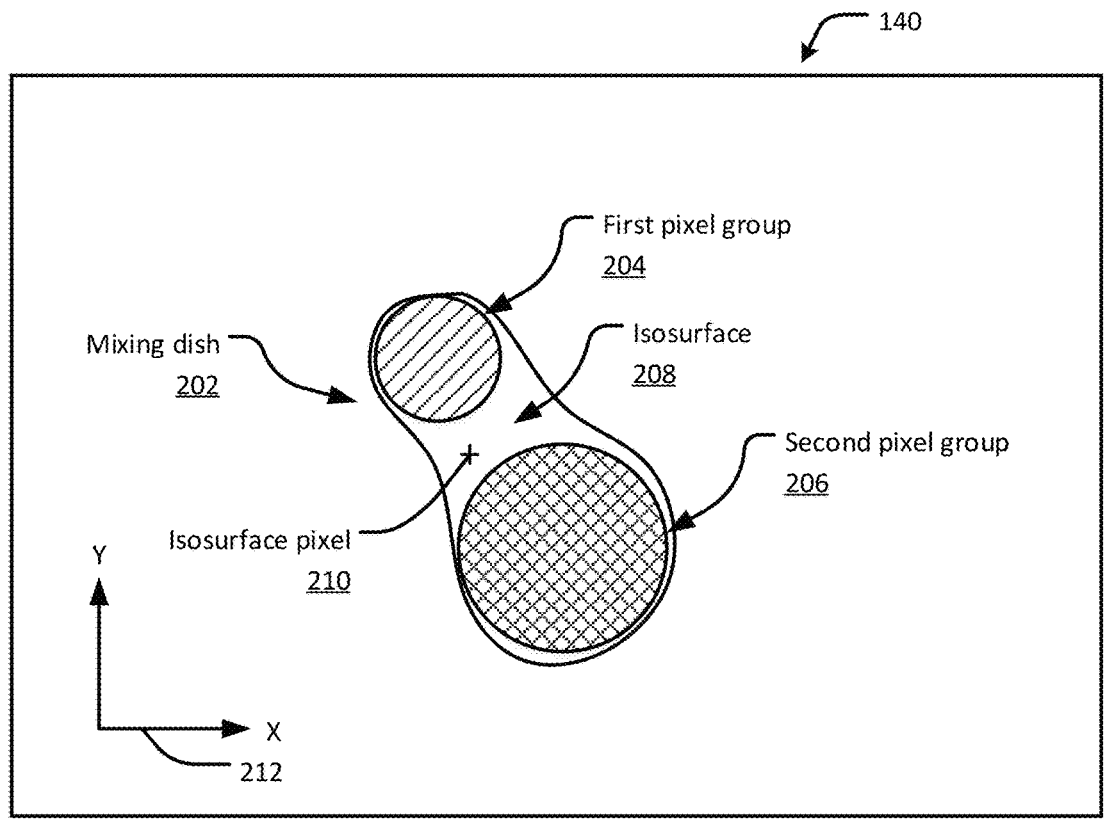
FIG. 2 shows an example interactive palette interface, in accordance with an embodiment of the present disclosure.

FIG. 2 shows an example palette 140 having a mixing dish 202, in accordance with an embodiment. The palette 140 may, for example, be implemented as part of the interactive palette interface 162 of FIG. 1. The palette 140 includes a reference frame 212 defined, for example, by x and y coordinates for locating pixels within the palette 140. For example, the mixing dish 202 may include a first group of pixels 204 and a second group of pixels 206. Each of the first and second groups of pixels 204 and 206 are also referred to as color blobs. It will be understood that the mixing dish 202 may include any number of color blobs; here, two color blobs are illustrated for purposes of explanation. The first pixel group 204 includes a first plurality of pixels arranged in a circle having radius $r_1$, and the second pixel group 206 includes a second plurality of pixels arranged in a circle having radius $r_2$. The pixels in the first pixel group 204 have a color $c_1$, and the pixels in the second pixel group 206 have a color $c_2$. The mixing dish 204 may further include an isosurface 208 that is contiguous with the first pixel group 204 and the second pixel group 206. Pixels on the isosurface 208, including an isosurface pixel 210, have one or more colors defined by the parametric influence function $M_i$ that defines the color $c_p$ for a pixel (e.g., the isosurface pixel 210) located at point p relative to the reference frame 212. The parametric function M defines the gradient of colors over the entire isosurface 208 as a function of the colors $c_1, c_2, \ldots c_n$, sizes (for example, radii $r_1$ and $r_2$), and locations of each pixel group (for example, the first pixel group 204 and the second pixel group 206). Different blending types can be used to generate the gradient, such as sRGB interpolation and interpolation in the spectral coefficient space of real paints rendered using the well-known Kubelka-Munk (K-M) transform for diffuse reflection of light.

To render a mixing dish $D_j$, all points $p \in \mathbb{A}^2$ satisfying the following constraint are rendered:

$$T \leq \sum_{B_i \in D_j} M_i(p)$$

For a given threshold T>0, this results in a smooth filled-in isosurface 208 of the blobs 204, 206 (blob $B_i$ in dish $D_j$) in the palette 140. To compute the color $c_p \in K$ at p, the parametric influence function $M_i(p)$ is used as interpolation weights:

$$c_p = \frac{\sum_{B_i \in D_j} M_i(p) \cdot c_i}{\sum_{B_i \in D_j} M_i(p)}$$

The points p and the color $c_p$ of each point can be computed in parallel in a fragment shader.

sRGB colors can be used in the palette 140, although other color spaces can also be utilized. For example, instead of a 3D sRGB vector, $c_i$ can be a vector of physical Kubelka-Munk (K-M) coefficients. The coefficients are interpolated using the above equation for $c_i$ and the color can be rendered with the K-M equation. A set of real acrylic paint coefficients can be used as an alternative to sRGB. In some embodiments, special "transformer" blobs can be used, such as desaturators, which control the S component of the HSV color space.

FIGS. 3A-3F show several example palettes having 3, 4, 5, 6, 7 and 8 color blobs, respectively (top), and the corresponding color distributions sampled from the respective palettes and plotted in sRGB space (bottom).

Interactive Editing Example

The example palette interface 140 discussed with respect to FIG. 2 enables a responsive and expressive palette interface. Such an interface can be implemented on a computing device having a touch-sensitive screen, such as a tablet, or using a conventional input device, such as a mouse, stylus, or other suitable device. For example, a user can create a new mixing dish, add, remove and rearrange color blobs, and change paintbrush color using touch-based inputs. Because the standard HSV color picker is well suited for selecting a color, it is incorporated into the example palette representation in some embodiments.

The palette 140 can be edited interactively to parameterize a wide variety of color manifolds, which makes the representation a powerful and attractive mechanism for constructing custom color spaces and exploring color gamuts. FIGS. 4A-4F show various interactive editing functions of an example mixing dish 400 in an interactive palette interface, in accordance with an embodiment of the present disclosure. Generally, a user creates a color blob in the mixing dish 400 by selecting a color from, for example, a color wheel (see, for example, color picker 606 of FIG. 6), adding the selected color to the mixing dish 400 to create the color blob, moving the color blob around using, for example, a dragging motion, and resizing or rescaling the color blob using, for example, a pinching motion.

Figure 4A:
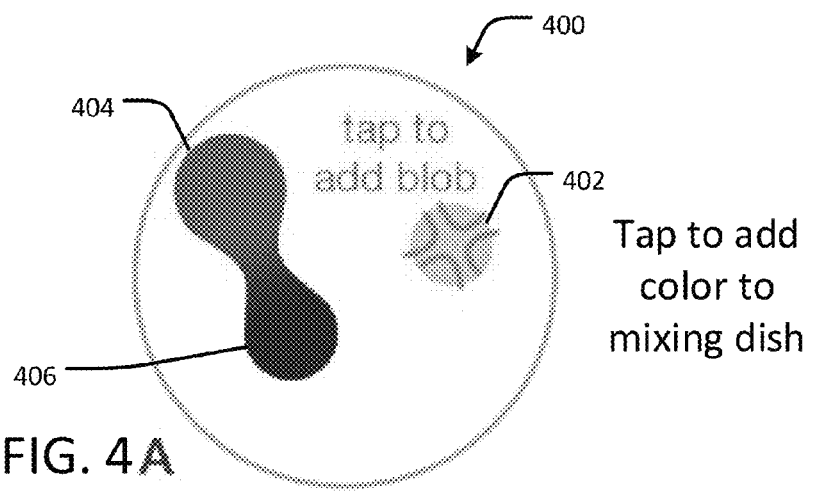

More particularly, FIG. 4A shows an example mixing dish 400 where the user taps the palette interface using, for example, a touch-sensitive display, a mouse, or another suitable input device to add a color blob 402 to the mixing dish 400. The color may, for example, be selected using any suitable color selection techniques, such as a color wheel, color slider, or color swatch interface. Also shown in FIG. 4A are two other color blobs 404 and 406.

Figure 4B:
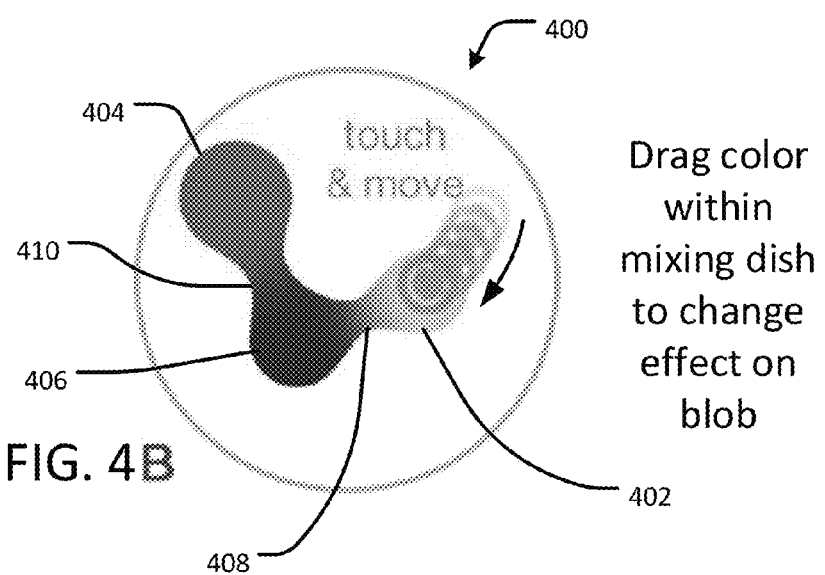

FIG. 4B shows the example mixing dish 400 of FIG. 4A where the user drags the added color blob 402 toward the other color blob 406. As the added color blob 402 is dragged closer to or away from the other color blob 406, the added color blob 402 has an effect on the colors of the mixing dish 400 by creating gradients 408 with a smooth, fluid-like behavior.

FIG. 4C shows the example mixing dish 400 of FIGS. 4A-4B where the user pinches the color blob 404 to change its size and its effect on the colors of the mixing dish 400. For example, changing the size of the color blob 404, as shown in FIG. 4C, also changes the colors of the gradient 410 adjacent to the color blob 404 as compared to FIG. 4B.

Figure 4D:
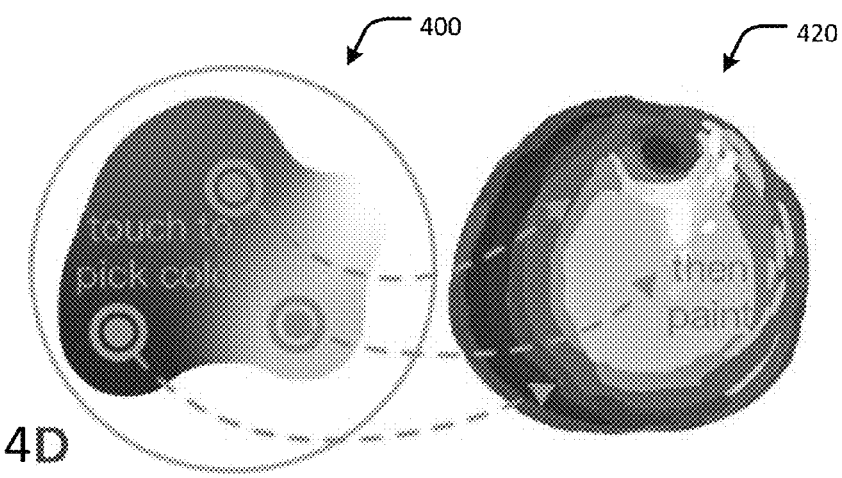

FIG. 4D shows the example mixing dish 400 of FIGS. 4A-4C where the user selects one or more colors from the mixing dish 400 to paint an artwork 420 using a paintbrush tool within the digital painting application. The colors can be selected by touching or otherwise selecting a point in the mixing dish 400 corresponding to the desired color for the paintbrush tool.

Figure 4E:
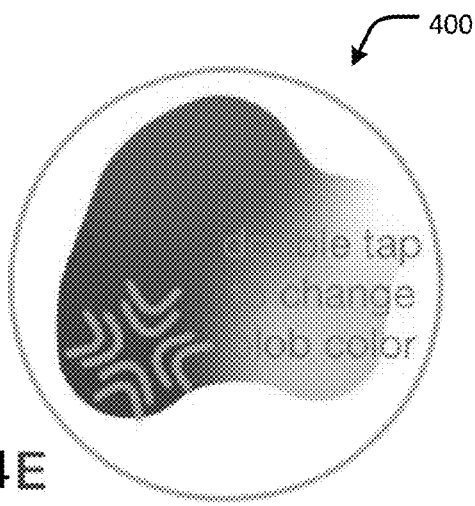

FIG. 4E shows the example mixing dish 400 of FIGS. 4A-4D where the user double-taps a point in the mixing dish 400 to change the color of that point. Once selected, the color of the point can be changed in a manner similar to adding the color blob 402, as discussed above with respect to FIG. 4A.

Figure 4F:
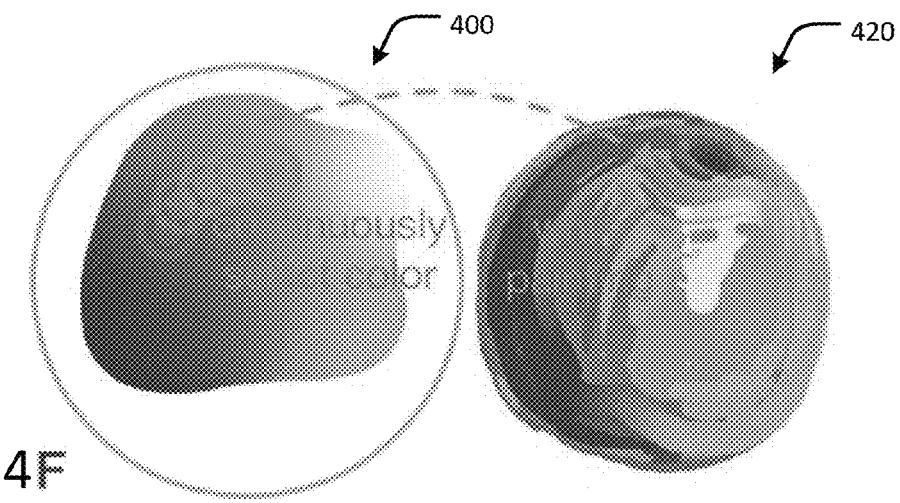

FIG. 4F shows the example mixing dish 400 of FIGS. 4A-4E where the user selects various colors from the mixing dish 400 by tapping on the desired colors while painting the artwork 420. This is similar to an artist picking up paint from a physical palette.

FIGS. 4A-4F show an example palette interaction sequence. Suppose an artist is painting a still life with a vase and fruit. Even if the scene is set before him or her, painting involves more than replicating colors. The fruit could be saturated with dramatic violet shadows and stark highlights, or more realistic, with brown shadows and subtle hues of pink. Such choices influence the style and mood, which the palette helps the artist explore by adding blobs, rearranging, and scaling them. As discussed above, the color blobs may be moved, for example, by touching and dragging on points of color, which creates new gradients with a smooth, fluid-like behavior. The artist can touch the palette to select a mixed color and begin painting with the selected color. Double tapping a blob opens an HSV picker to change its color and thus the gamut to paint another fruit. Once satisfied with the color arrangement, the palette can be recalled for painting more fruit. When painting a reflection of the fruit in the vase, the artist can copy and paste a color from the fruit palette to the vase palette, creating a harmonizing gradient.

History and Recoloring

According to an embodiment, the color history of an artwork is stored in association with the interactive palette as the set of colors $H^c = \{c_1 \ldots c_k\}$ that were used to paint at least one stroke of the artwork. Each blob in the palate uses, for example, 8 bytes of storage. A typical mixing dish may contain a relatively small number of blobs.

The palette history is equivalent to the palette P, where each mixing dish $D_i$ can be explicitly created by the user or can be saved automatically during palette editing. Each mixing dish $D_i$ references a parent mixing dish $D_i^p$, if any, as well as a list of colors $H_i^c \in H^c$ that were picked from $D_i^p$. A snapshot of the state of the mixing dish is stored if the new mixing dish $D_i$ no longer includes the same colors in $H_i^c$. For example, the user edits mixing dish $D_0$ to produce a new mixing dish $D'_0$ representing the same colors as mixing dish $D_0$ (perhaps in a different arrangement). In this case the previous mixing dish $D_0$ is discarded (not stored) because $D'_0$ represents the same colors. Later, the user creates a new mixing dish $D_1$ from A; and later edits $D_1$ to produce $D_2$, which includes at least one different color from $D_1$. This causes $D_1$ to be saved automatically as a separate snapshot, since $D_2$ includes at least one color that is not also included in $D_1$.

Figure 5:
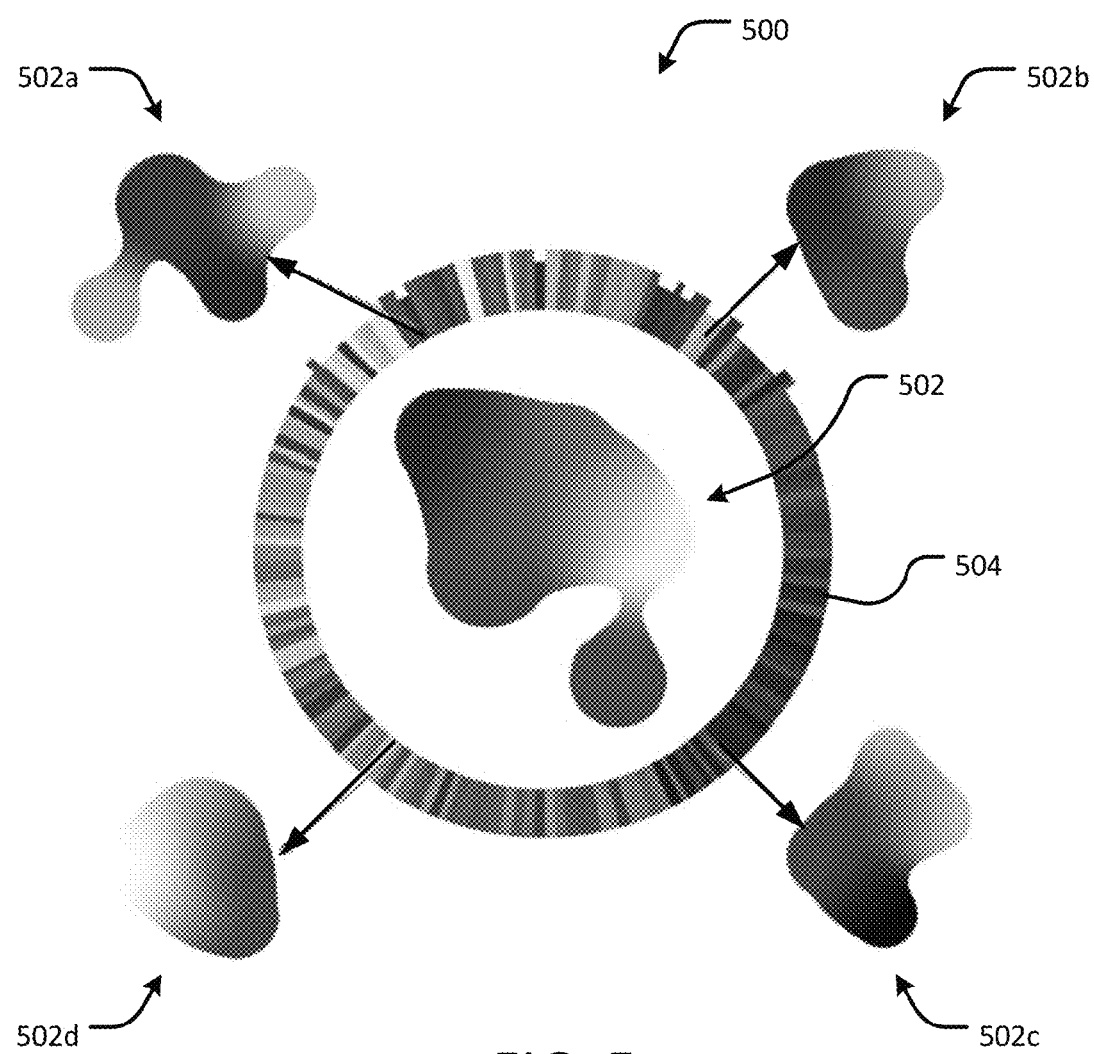
FIG. 5 shows an example interactive palette interface having a color history wheel, in accordance with an embodiment of the present disclosure.
Figure 6:
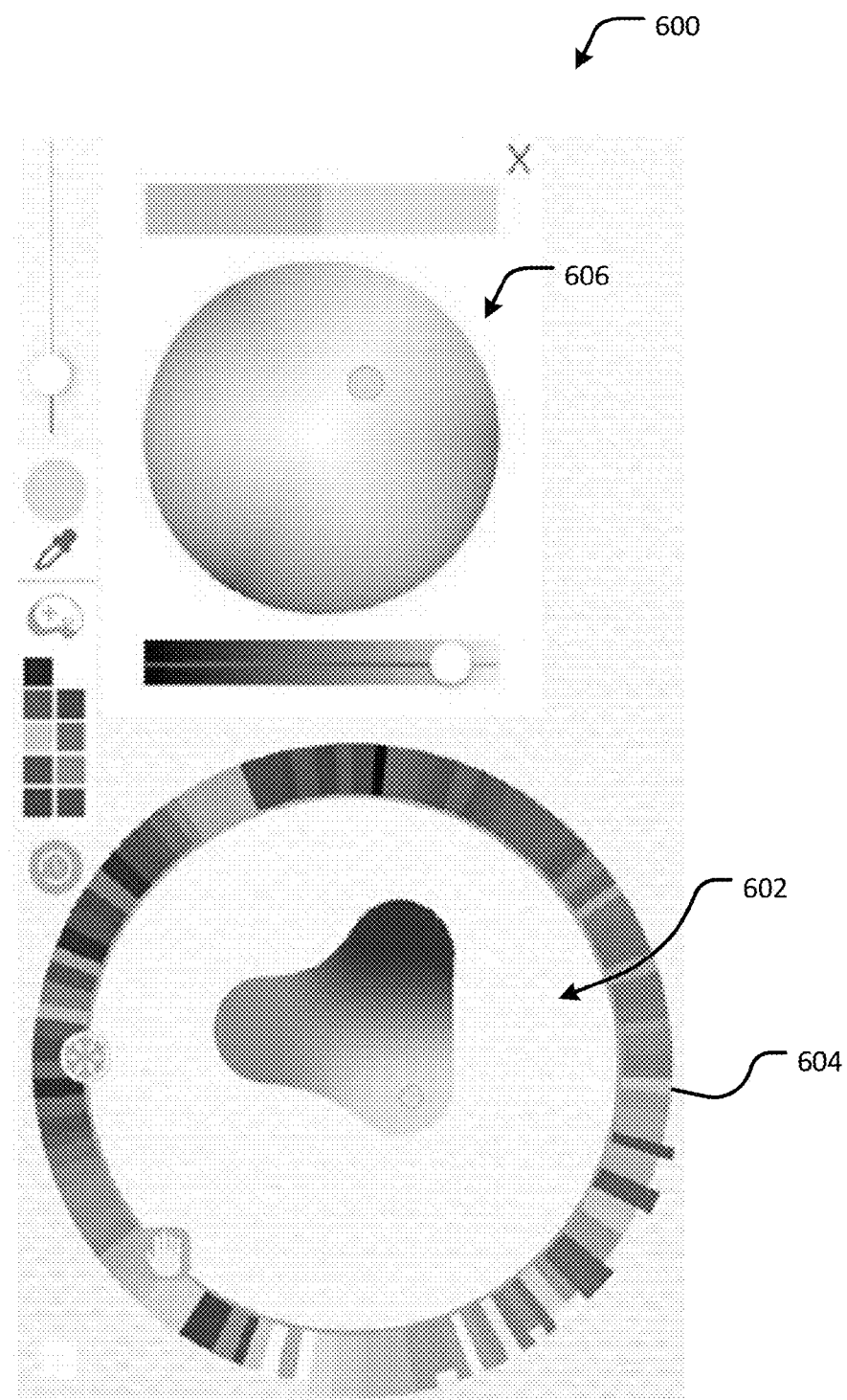
FIG. 6 shows another example interactive palette interface having a color history wheel, in accordance with an embodiment of the present disclosure.

To render P, one mixing dish $D_i$ is displayed at a time, and the colors in the color history $H^c$ are arranged by hue as a ring of pixels around the perimeter of the mixing dish, such as shown in FIGS. 5 and 6 (color history wheel 504, 604). Each pixel in the ring corresponds to a mixing dish $D_i$ stored in the history. Selecting a perimeter color $c_j$ in the color history wheel populates the palette with mixing dish $D_f$ such that $c_j \in H_f^c$, where f refers to a specific mixing dish $D_f$ stored in the history and corresponding to the selected color $c_j$. Similarly, mixing dish $D_f$ can be recalled from the history by selecting any element of $H_f^c$, from the canvas using a standard eyedropper tool. As it is possible to revisit a saved mixing dish $D_i$ and edit it at a later time, the palette history can be represented as a forest of trees, where each mixing dish has at most one parent tree in the forest. Since a color may be represented on more than one mixing dish, selecting a dish by a color on the canvas may be ambiguous. Therefore, every pixel in the artwork is tagged with a mixing dish identification (ID) value used to paint the corresponding pixel. The ID value is then used to recall the specific mixing dish $D_i$ that corresponds to the selected color.

FIG. 5 shows an example interactive palette interface 500 having a color history wheel 504, represented by a ring of pixels at least partially surrounding a mixing dish 502, in accordance with an embodiment of the present disclosure. The mixing dish 502 generally functions as described above with respect to the mixing dish 400 of FIGS. 4A-4F, and includes, among other things, the isosurface pixels (e.g., such as indicated at 208, 210 in FIG. 2). Different points along the color history wheel 504 correspond to colors in the palette 500 at particular points in time as the user edits and modifies the colors of the palette. For example, mixing dish 502a corresponds to the palette 500 at a first point in time, mixing dish 502b corresponds to the palette 500 at a second point in time, mixing dish 502c corresponds to the palette 500 at a third point in time, and mixing dish 504d corresponds to the palette 500 at a fourth point in time. The mixing dishes 502a, 502b, 502c and 502d are not necessarily depicted in the palette 500 as shown in FIG. 5, but are shown in FIG. 5 for explanatory purposes. In practice, tapping or otherwise selecting a point along the color history wheel 504 causes the colors of the mixing dish 502 in the center of the palette interface 500 to change to the colors corresponding to the selected point (e.g., to one of 502a, 502b, 502c or 502d).

FIG. 6 shows an example interactive palette interface 600 having a color history wheel, represented by a ring of pixels 604 at least partially surrounding a mixing dish 602, in accordance with an embodiment of the present disclosure. The mixing dish 602 generally functions as described above with respect to the mixing dish 400 of FIGS. 4A-4F. Similar to FIG. 5, different points along the color history wheel 604 correspond to colors in the palette 600 at particular points in time as the user edits and modifies the colors of the palette. The interactive palette interface 600 further includes a color picker 606, which displays a gamut of colors from which the user can choose colors to add to the mixing dish 602. For instance, the user can select a point on the color picker 606 corresponding to the color the user wishes to add to the mixing dish 602. Once added to the mixing dish 602, the color becomes a color blob, which can be manipulated in numerous ways such as variously set forth in this disclosure.

Painting Recoloring

The association between palette history and canvas colors enables painting recoloring that is history aware. In painting recoloring mode only changes to blob colors are allowed (they may not be moved, added, or deleted). When a mixing dish $D_i$ is edited by changing the color of blob $B_c$, the edit is propagated to all the descendant mixing dishes $D_1^i \ldots D_k^i$. If $B'_c$ in a child dish $D_j^i$ is the same color as its parent, then it is updated to the new color and $D_j^i$ becomes $\overline{D_j^i}$. For example, changing the color of a brown blob to color c in $D_1$ changes the corresponding brown blobs in $D_2$ and $D_4$ to c, but will cause no changes in $D_3$, which does not include the brown color.

Once $\overline{D_1^i} \ldots \overline{D_k^i}$ are updated, the edit is transferred to the image. Each pixel x in the painting contains color $c_x$ and a reference to the dish $D_x$ used to pick $c_x$. A location $p_x$ of color $c_x$ in the original $D_x$ is selected before the edit. Then, pixel x is updated with the color at location $p_x$ in the edited dish $\overline{D_x}$. Thus, an artist can affect large areas of the painting by editing mixing dishes high up in the history tree or only change the recent details by editing the leaf dishes. After recoloring the artwork, the artist can continue painting with the updated mixing dishes in the palette history.

An advantage of the disclosed embodiments is that the palette history can distinguish between edits to similarly colored regions of the artwork based on how they were painted, for example, the water and sky regions of a landscape painting, whereas some existing palette interfaces are unable to recolor the regions separately. This also enables the artist to explore and change the color gamut even after spending a considerable time painting.

Example Automatic Palette Construction

Digital artists may, in some instances, use an example image as a color reference while painting an artwork. However, an example image does not support exploration of different color combinations, as the colors in the image cannot be easily edited, or accessing history, as colors cannot be re-selected. According to an embodiment, the example image is converted into an interactive palette interface. This embodiment provides an editable color gamut that functions as the starting point of artistic color exploration.

For a given input color image I, defined as a discrete set of pixels $x_i$ with color $c(x_i)$ and position $p(x_i)$, a palette P represents the color gamut of I and includes one or more mixing dishes $D_i$. The energy of P is minimized as follows:

$$E_i(P) = \frac{1}{\|I\|} \sum_{x \in I} \mathbb{1}_P(c(x))$$

where the indicator function $\mathbb{1}_P$ assigns a value of 0 to any input c that has a sufficiently close color in L*a*b* space in any of the dishes in P, and a maximum cost of 1 otherwise. $E_i(P)$ can be interpreted as the fraction of colors in I represented by the palette. Sampling and clustering is employed to produce a simplified result.

The problem formulated above is a moderately-sized non-convex constrained discrete-continuous optimization problem, with an added complexity introduced by the variable number of blobs and mixing dishes. A palette can consist of any number n of mixing dishes and the number of blobs in a mixing dish ranging from 1 to a moderate number (e.g., 20), and 6 variables per blob (position, color, radius). The search space is reduced by making the following observations:

1: The set of colors in I are sufficient for blob colors.
2: Natural images have many redundant colors.
3: Neighboring pixels come from the same mixing dish.
4: Constant size blobs on a regular grid are sufficient.

From these observations, the following algorithm is formulated. Colors are sampled from I and single-link agglomerative clustering in $\mathbb{R}^5$ (position and L*a*b* color) is used to find a set of color clusters, corresponding to colors drawn from separate mixing dishes. During clustering, a palette mixing dish configuration representing each cluster is maintained, and the mixing dish is adjusted after merging two clusters by performing Markov Chain Monte Carlo sampling of palette configurations over a regular grid with constant blob size and with blob colors selected only from color samples belonging to the merged cluster.

---

Algorithm 1-Automatic Palette Construction

---

```
procedure generatePalette(I)
    S ← sampleImage(I,n₀) // sample position, color
    Ŝ ← clusterRedundantColors(S)
    C ← absorbSmallestClusters(Ŝ, n₁)
    D ← initMixingDishes(C)
    while not termination_condition do
        C₁,C₂ ← closest pair in C // single link L2 in R5
        C₁ ← mergeClusters(C₁,C₂)
        D₁ ← mergeDishes(C₁,D₁,D₂)
        C ← C \ C₂
        D ← D \ D₂
    D ← absorbSmallPalettes(D)
end procedure
procedure mergeDishes (C,D₁,D₂)
    e₀ ← E_C(D₁) // cost of D₁ for all colors
    d₀ ← D₁
    d*, e* ← sampleDishes(C, e₀,d₀)
    return d*
end procedure
```

---

The algorithm has parameters $n_0$, $n_1$ and $E_t$, the target cost. First, $n_0$ uniform samples S are drawn from input image I. Barely distinguishable colors are clustered (for example, L*a*b* distance less than t=3) in sample image S into a much smaller set Ŝ, where each entry $\hat{s}_i$ contains mean color $c(\hat{s})$, mean location, and count. Clusters that have fewer than three samples are discarded. In some embodiments, $n_0$=10,000, which reduces the size of S for most images by at least one order of magnitude and expedites the cost computation. To compute the cost, the mean colors in Ŝ are used as a proxy for I, weighing each $\mathbb{1}_P c(\hat{s}_i)$ by its count.

All subsequent clustering is performed in $\mathbb{R}^5$ (L*a*b* color and position), with vectors scaled to be in [0, 1] to attribute roughly the same importance to position and color. A cluster is initialized for every $\hat{s}_i$, and merge the smallest clusters until only $n_1$ clusters remain in the set C. In some embodiments, $n_1$=300 and the colors in each cluster are approximated by at most three blobs. Each cluster's dish is initialized by sampling 1, 2 and 3 blob configurations until $E_t$ is reached, using colors from all the ŝ in the cluster and its mean color. All blobs are the same size and are placed on a fixed reference grid.

Single-link agglomerative clustering of C is performed until some termination condition is reached, such as the number of mixing dishes (||C||) or minimum distance between clusters. After each merge the space of mixing dishes is sampled using Metropolis-Hastings algorithm with $(1-E_C)$ as the proposal distribution, thus making low cost samples more likely. The cost is computed for the sampled mixing dish and the coalesced colors $\hat{s} \in C$, the set of colors belonging to the merged clusters. As a random step, a blob can be added, removed, or can change color, with colors selected only from C. Sampling terminates if $E_t$ is reached. Otherwise, a fixed number of iterations is allowed per merge, and the best sample is kept. When clustering terminates, the smallest palettes are merged to avoid one and two blob mixing dishes that can easily join another mixing dish.

Example Methodologies

Figure 7:
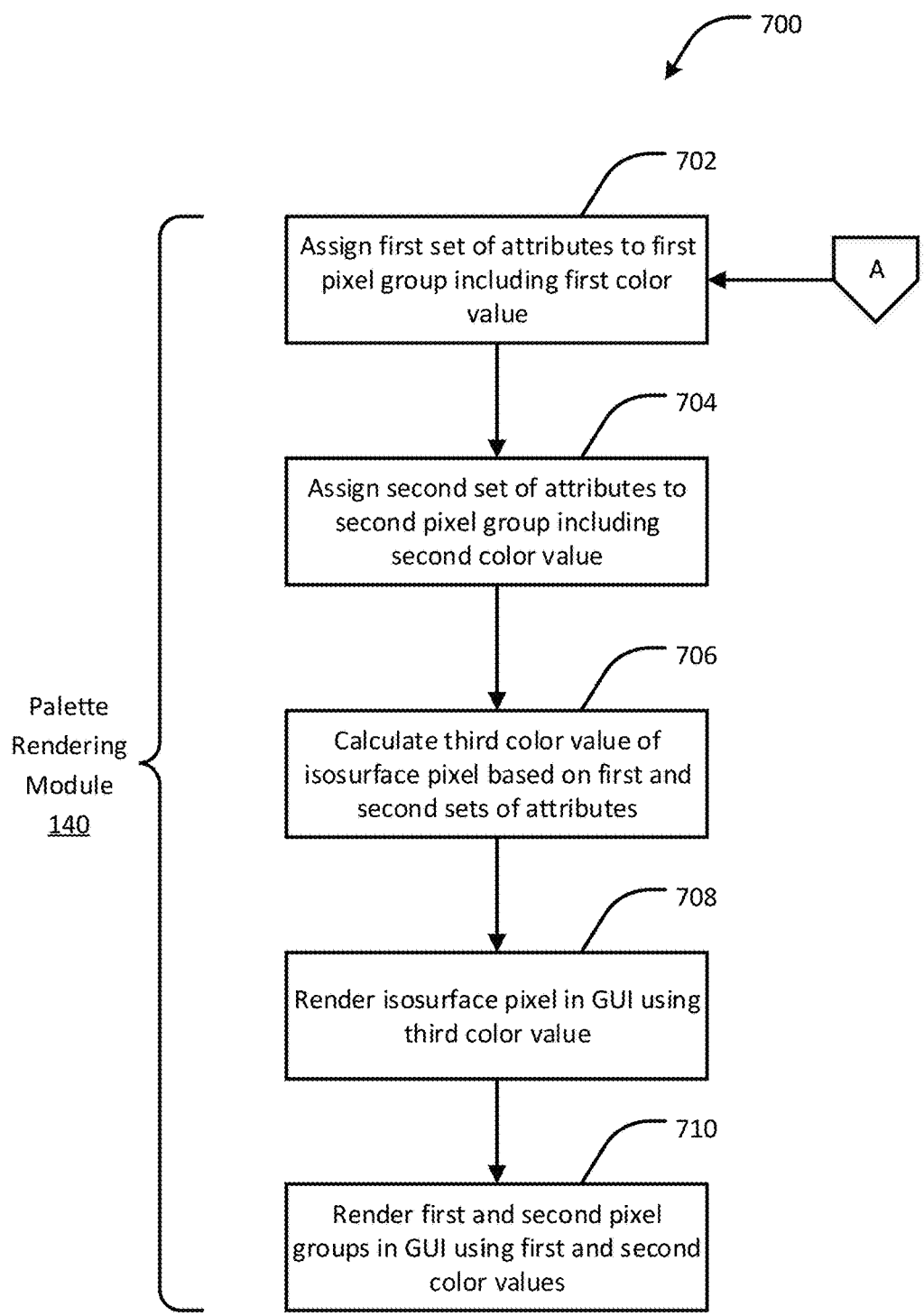
FIG. 7 is a flow diagram of an example methodology for digital painting using an interactive palette interface, in accordance with an embodiment of the present disclosure.

FIG. 7 is a flow diagram of an example methodology 700 for digital painting using an interactive palette interface, in accordance with an embodiment of the present disclosure. The methodology 700 may, for example, be implemented in the palette rendering module 140 of the digital painting application 130 of FIG. 1. In general, the methodology 700 is configured to assign attributes to one or more groups of pixels, or color blobs, in a graphical user interface (GUI), where the attributes include the color, position and size of the pixel groups, calculate a color of at least one other pixel in the GUI as a parametric function of the pixel group attributes, and render the pixels in the GUI.

In more detail, the methodology 700 includes assigning 702 a first set of attributes to a first pixel group. The first set of attributes includes a first reference coordinate point, a first color value, and a first size value. The first reference coordinate point defines a location of the first pixel group within the GUI (such as depicted in FIG. 2). The first color value defines a color of the first pixel group (e.g., an RGB color value or other value representing a color within a suitable color space). The first size value defines a number of pixels included in the first pixel group (e.g., the number of pixels in a region defined by a radius r). In some embodiments, a client device, which is configured to render the interactive palette interface, receives a user input corresponding to a selection of the first reference coordinate point, the first color value, the first size value, or any combination of these. The methodology 700 further includes assigning 704 a second set of attributes to a second pixel group. The second set of attributes includes a second reference coordinate point, a second color value, and a second size value. The second reference coordinate point defines a location of the second pixel group within the GUI (such as depicted in FIG. 2). The second color value defines a color of the second pixel group (e.g., RGB color value or other value representing a color within a suitable color space). The second size value defines a number of pixels included in the second pixel group (e.g., the number of pixels in a region defined by a radius r). In some embodiments, the client device receives a user input corresponding to a selection of the second reference coordinate point, the second color value, the second size value, or any combination of these. It will be understood that any number of user inputs corresponding to any number of reference points, color values and size values can be received by the client device, as will be apparent in view of this disclosure.

The methodology 700 further includes calculating 706 a third color value defining a color of an isosurface pixel at a third reference coordinate point (such as depicted in FIG. 2). The third color value (or multiple third color values) represents the color of a pixel in the interactive palette interface, which is not necessarily included in the first or second pixel groups and can be a pixel between or otherwise proximate to the positions of one or more pixels in the first and second pixel groups. For example, the third color value may represent at least a portion of a gradient of colors in one or more pixels (such as the isosurface pixel 210 of FIG. 2) between or otherwise proximate to the positions of one or more pixels in the first and second pixel groups (such as the first and second pixel groups 204 and 206 of FIG. 2). To obtain the gradient, the third color value of each isosurface pixel is defined as a parametric function of each of the first set of attributes and the second set of attributes, such as in the following equation:

$$c_p = \frac{\sum_{B_i \in D_j} M_i(p) \cdot c_i}{\sum_{B_i \in D_j} M_i(p)}$$

As discussed above, when the user places the color blobs within a threshold distance T of each other, the colors of the gradient change as the user adjusts the positions or sizes of each color blob. For example, where there are three colors blobs in the interactive palette interface, the colors of the gradient may change as the user moves one blob around or resizes the blob with respect to the other two blobs, such as discussed with respect to FIGS. 4A-4F.

The methodology 700 further includes rendering 708, in the GUI, the isosurface pixel at the third reference coordinate point using the third color value. The rendering of the isosurface pixel, as well as other pixels in the region of the isosurface pixel, produces a color gradient in the palette from which the user can select a color for painting via the interactive palette interface. In some embodiments, the methodology 700 further includes rendering 710, in GUI, the first pixel group at the location of the first pixel group using the first color value (such as a first color blob having a position, color and size), and rendering, in the GUI, the second pixel group at the location of the second pixel group using the second color value (such as a second color blob having a position, color and size). Such rendering may produce, for example, a palette such as shown in FIGS. 2 and 3A-3F.

Figure 8:
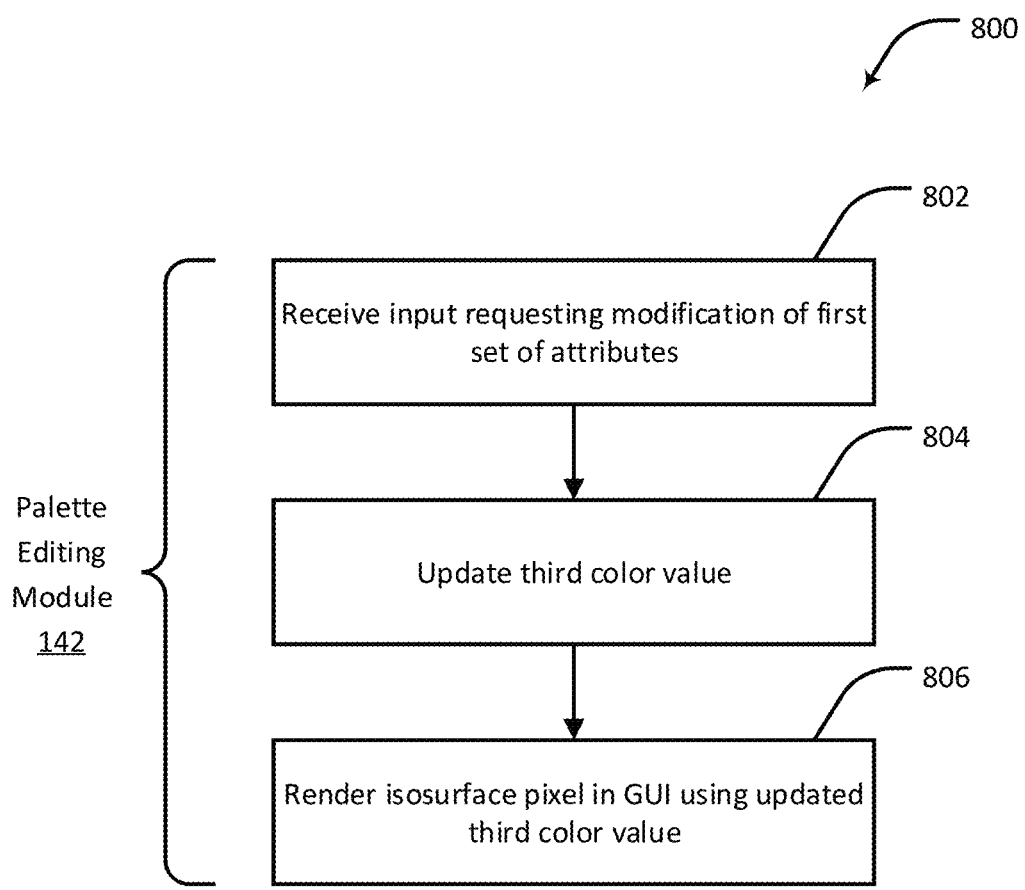
FIG. 8 is a flow diagram of an example methodology for editing an interactive palette, in accordance with an embodiment of the present disclosure.

FIG. 8 is a flow diagram of an example methodology 800 for editing an interactive palette, in accordance with an embodiment of the present disclosure. The methodology 800 may, for example, be implemented in the palette editing module 142 of the digital painting application 130 of FIG. 1. In general, the methodology 800 is configured to receive an input representing a modification of the color, position or size of one or more of the pixel groups, update the color of one or more other pixels in the GUI using the parametric function, and render the updated pixels in the GUI.

In more detail, the methodology 800 includes receiving 802 an input representing a modification of the first set of attributes. The input may, for example, be generated by a user interacting with the palette interface to add, remove, or modify a color blob or pixel group within a mixing dish. For instance, the user may tap the interface to add or remove a color, drag a color blob across the interface to a different position within the GUI, or pinch the color blob to enlarge or reduce the size of the color blob (and thus increase or decrease the number of pixels in the color blob). The methodology 800 further includes updating 804, in response to the input, the third color value based on the change. For example, after the user has added, removed or modified the color blob, the color of the isosurface pixels in the mixing dish can be updated using the following equation, where the attributes of the color blob have been modified by the input:

$$c_p = \frac{\sum_{B_i \in D_j} M_i(p) \cdot c_i}{\sum_{B_i \in D_j} M_i(p)}$$

The methodology 800 further includes rendering 806, in the GUI, the isosurface pixel using the updated third color value. This causes the palette interface to update the color gamuts and gradients in response to the user's inputs.

Figure 9:
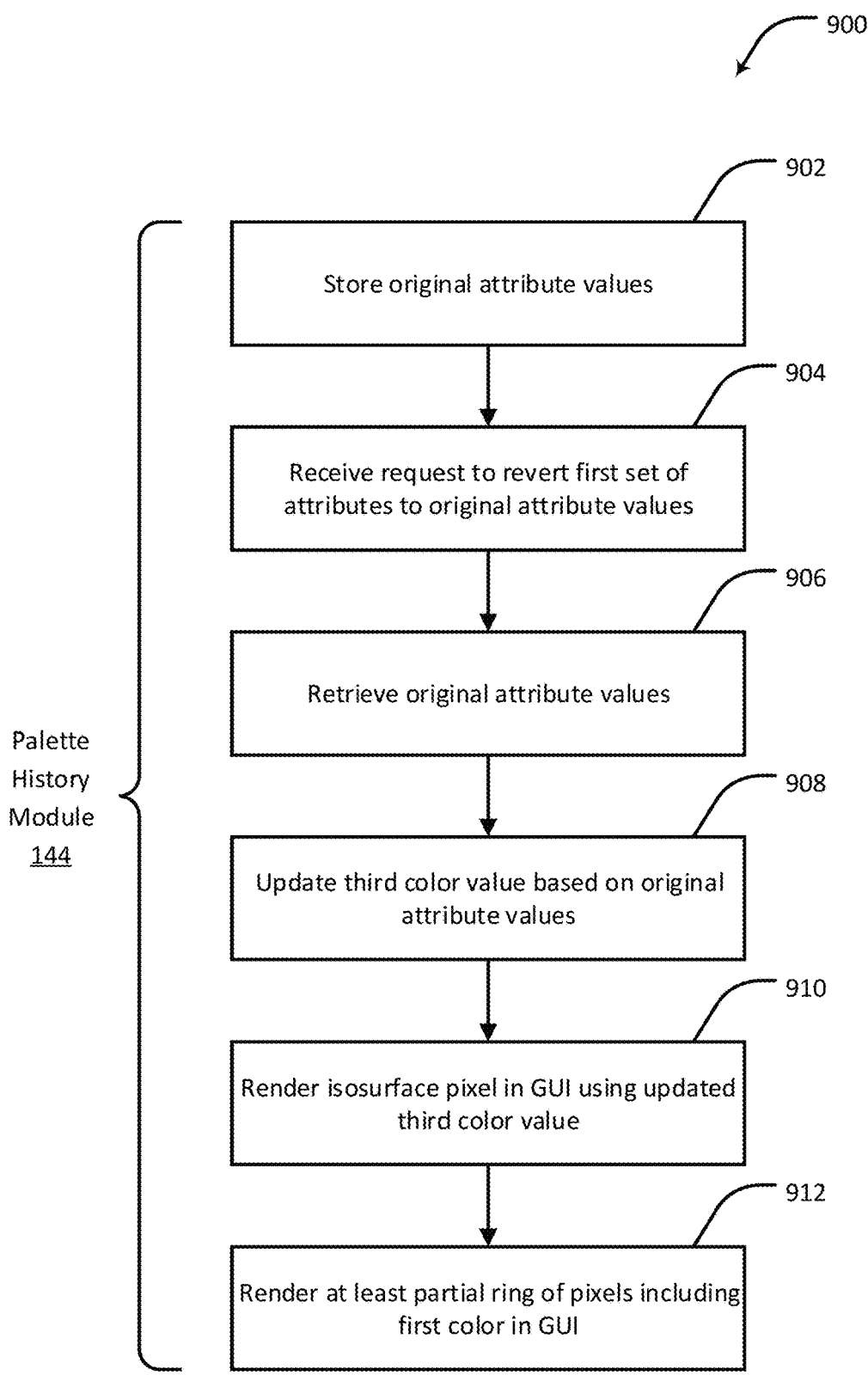
FIG. 9 is a flow diagram of an example methodology for maintaining a color history for an interactive palette interface, in accordance with an embodiment of the present disclosure.

FIG. 9 is a flow diagram of an example methodology 900 for maintaining a color history for an interactive palette interface, in accordance with an embodiment of the present disclosure. The methodology 900 may, for example, be implemented in the palette history module 144 of the digital painting application 130 of FIG. 1. In general, the methodology 900 is configured to store one or more of the attributes of the pixel groups prior to modification of the attributes such that the attributes, once modified, can be reverted to the stored values in response to a user input.

In more detail, the methodology 900 includes storing 902 the first set of attributes as an original first set of attributes in an electronic storage medium and prior to the modification of the first set of attributes. For example, each time a user adds, removes or modifies a color blob, such as discussed with respect to FIG. 8, the original or prior values of the attributes of the first pixel group are saved in storage or memory for future reference. The methodology 900 further includes receiving 904 an input representing a request to revert the change of the first set of attributes. For example, the user may tap a portion of the GUI that shows a color history wheel, such as described with respect to FIGS. 5 and 6, to recall a set of palette colors that was stored 902 earlier, before the palette was modified (such as described with respect to FIG. 8). The methodology 900 further includes retrieving 906, from the electronic storage medium, the original first set of attributes (e.g., in response to receiving 904 the input), and updating 908, in response to the input, the third color value based on the original first set of attributes. For example, after the user has reverted the palette to an earlier state, the color of the isosurface pixels in the mixing dish can be updated using the following equation, where the attributes of the color blob have been reverted to the earlier state:

$$c_p = \frac{\sum\limits_{B_i \in D_j} M_i(p) \cdot c_i}{\sum\limits_{B_i \in D_j} M_i(p)}$$

The methodology 900 further includes rendering, in the GUI, the isosurface pixel using the updated third color value. This causes the palette interface to update the color gamuts and gradients in response to the user's input to revert the colors of the palette to an earlier state.

In some embodiments, the methodology 900 further includes rendering 912, in the GUI, at least a partial ring of pixels including the first color associated with the first set of attributes. The ring of pixels at least partially surrounds the location of the isosurface pixel, such as shown in FIGS. 5 and 6.

Figure 10:
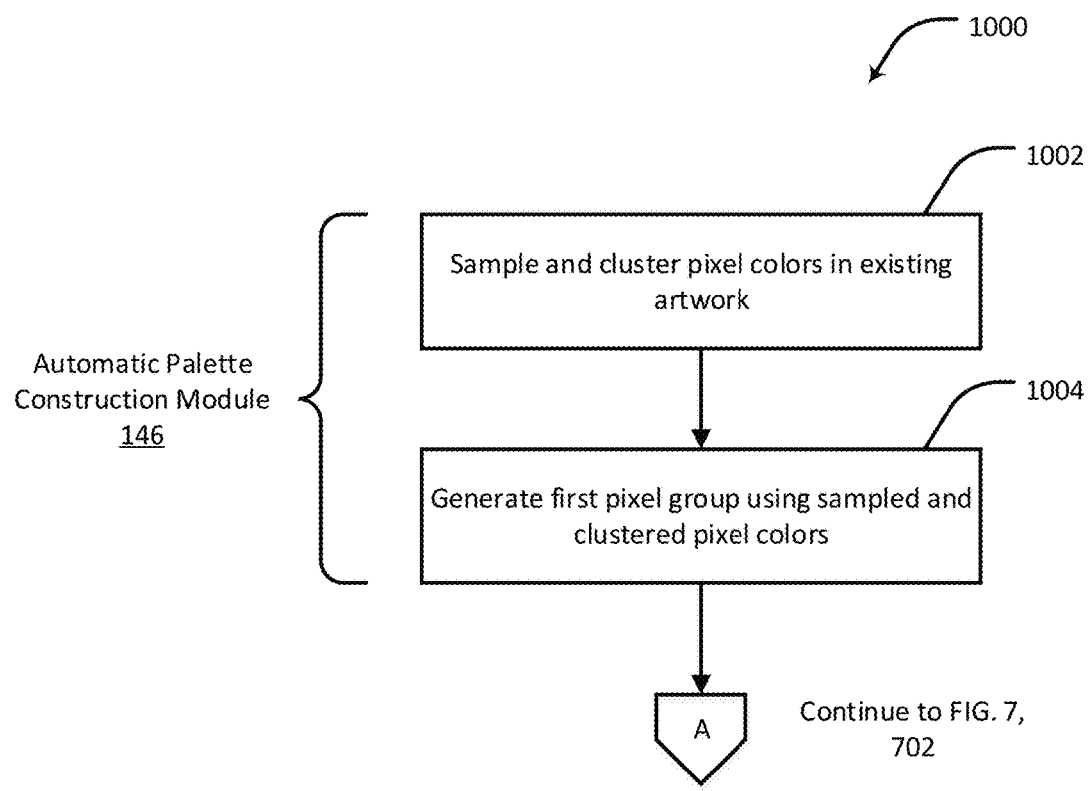
FIG. 10 is a flow diagram of an example methodology for automatically constructing a palette interface, in accordance with an embodiment of the present disclosure.

FIG. 10 is a flow diagram of an example methodology 1000 for automatically constructing a palette interface, in accordance with an embodiment of the present disclosure. The methodology 1000 may, for example, be implemented in the automatic palette construction module 146 of the digital painting application 130 of FIG. 1. In general, the methodology 1000 is configured to convert one or more colors from an existing digital artwork into an interactive palette interface. This is particularly useful when the user wishes to create a palette using colors found in an existing artwork as a starting point for modifying the artwork or creating a new artwork having colors similar to the existing artwork.

In more detail, the methodology 1000 includes sampling and clustering 1002 colors of pixels in an existing digital artwork. An example sampling and clustering algorithm is described above in Algorithm 1. The methodology 1000 further includes generating 1004 the first pixel group (or any one or more other pixel groups) based at least in part on the sampled and clustered pixels from the existing artwork. Once the pixel group or groups are generated 1004, the interactive palette interface can be rendered, edited, and so forth such as described with respect to FIG. 7.

Figure 11:
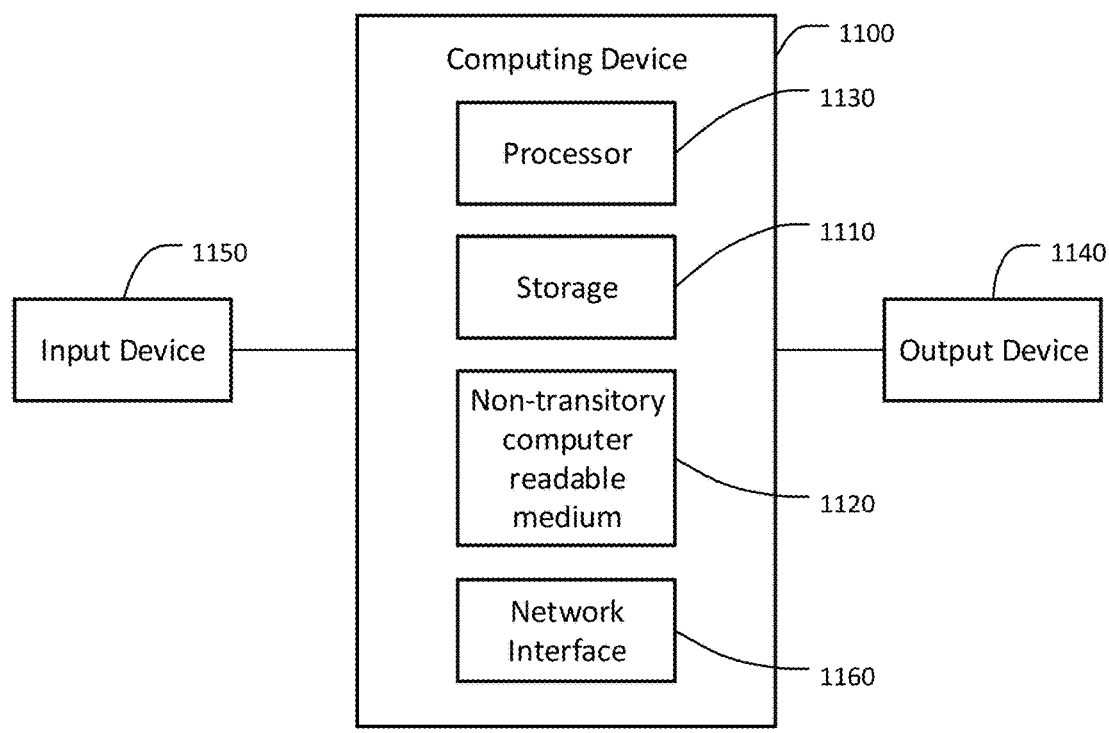
FIG. 11 is a block diagram representing an example computing device that may be used to perform any of the techniques as variously described in this disclosure.

FIG. 11 is a block diagram representing an example computing device 1100 that may be used to perform any of the techniques as variously described in this disclosure. For example, the system 100 of FIG. 1, or any portions thereof, and the methodologies of FIGS. 7-10, or any portions thereof, may be implemented in the computing device 1100. The computing device 1100 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 1100 includes one or more storage devices 1110 or non-transitory computer-readable media 1120 having encoded thereon one or more computer-executable instructions or software for implementing techniques as variously described in this disclosure. The storage devices 1110 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 1110 may include other types of memory as well, or combinations thereof. The storage device 1110 may be provided on the computing device 1100 or provided separately or remotely from the computing device 1100. The non-transitory computer-readable media 1120 may include, but are not limited to, one or more types of hardware memory, non-transitory tangible media (for example, one or more magnetic storage disks, one or more optical disks, one or more USB flash drives), and the like. The non-transitory computer-readable media 1120 included in the computing device 1100 may store computer-readable and computer-executable instructions or software for implementing various embodiments. The computer-readable media 1120 may be provided on the computing device 1100 or provided separately or remotely from the computing device 1100.

The computing device 1100 also includes at least one processor 1130 for executing computer-readable and computer-executable instructions or software stored in the storage device 1110 or non-transitory computer-readable media 1120 and other programs for controlling system hardware. Virtualization may be employed in the computing device 1100 so that infrastructure and resources in the computing device 1100 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1100 through an output device 1140, such as a screen or monitor, which may display one or more user interfaces provided in accordance with some embodiments. The output device 1140 may also display other aspects, elements or information or data associated with some embodiments. The computing device 1100 may include other I/O devices 1150 for receiving input from a user, for example, a keyboard, a joystick, a game controller, a pointing device (e.g., a mouse, a user's finger interfacing directly with a touch-sensitive display device, etc.), or any suitable user interface. The computing device 1100 may include other suitable conventional I/O peripherals. The computing device 1100 includes or is operatively coupled to various suitable devices for performing one or more of the aspects as variously described in this disclosure.

The computing device 1100 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the digital painting application 130, the palette rendering module 140, the palette editing module 142, the palette history module 144, the automatic palette construction module 146, the GUI 160, or any combination of these, is implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 1100, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method of providing an interactive palette interface (GUI) in a digital painting application. The method includes assigning a first set of attributes to a first pixel group. The first set of attributes includes a first reference coordinate point, a first color value, and a first size value. The first reference coordinate point defines a location of the first pixel group within the GUI. The first color value defines a color of the first pixel group. The first size value defines a number of pixels included in the first pixel group. The method further includes assigning a second set of attributes to a second pixel group. The second set of attributes includes a second reference coordinate point, a second color value, and a second size value. The second reference coordinate point defines a location of the second pixel group within the GUI. The second color value defines a color of the second pixel group. The second size value defines a number of pixels included in the second pixel group. The method further includes calculating a third color value defining a color of an isosurface pixel at a third reference coordinate point. The third color value is a parametric function of each of the first and second reference coordinate points, the first and second color values, and the first and second size values. The method further includes rendering, in the GUI, the isosurface pixel at the third reference coordinate point using the third color value. In some embodiments, the method includes rendering, in GUI, the first pixel group at the location of the first pixel group using the first color value, and rendering, in the GUI, the second pixel group at the location of the second pixel group using the second color value. In some embodiments, the method includes receiving an input representing a modification of the first set of attributes; updating, in response to the input, the third color value based on the change; and rendering, in the GUI, the isosurface pixel using the updated third color value. In some such embodiments, the method further includes storing the first set of attributes as an original first set of attributes in an electronic storage medium and prior to the modification of the first set of attributes. In some such embodiments, the method further includes receiving an input representing a request to revert the change of the first set of attributes; retrieving, from the electronic storage medium, the original first set of attributes; updating, in response to the input, the third color value based on the original first set of attributes; and rendering, in the GUI, the isosurface pixel using the updated third color value. In some embodiments, the method includes rendering, in the GUI, at least a partial ring of pixels including the first color associated with the first set of attributes, the ring of pixels at least partially surrounding the location of the isosurface pixel. In some embodiments, the method includes generating the first pixel group based at least in part on a color of a plurality of pixels of an existing digital artwork. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of providing an interactive palette interface (GUI) in a digital painting application, the method comprising:

assigning a first set of attributes to a first pixel group, the first set of attributes including a first reference coordinate point, a first color value, and a first size value, the first reference coordinate point defining a location of the first pixel group within the GUI, the first color value defining a color of the first pixel group, and the first size value defining a number of pixels included in the first pixel group;

assigning a second set of attributes to a second pixel group, the second set of attributes including a second reference coordinate point, a second color value, and a second size value, the second reference coordinate point defining a location of the second pixel group within the GUI, the second color value defining a color of the second pixel group, and the second size value defining a number of pixels included in the second pixel group;

calculating a third color value defining a color of an isosurface pixel at a third reference coordinate point, the isosurface pixel being contiguous with at least one of the pixels in the first and second pixel groups, the isosurface pixel being different from the pixels in the first and second pixel groups, the third color value being a parametric function of each of the first and second reference coordinate points, the first and second color values, and the first and second size values; and rendering, in the GUI, the isosurface pixel at the third reference coordinate point using the third color value.

2. The method of claim 1, further comprising rendering, in GUI, the first pixel group at the location of the first pixel group using the first color value, and rendering, in the GUI, the second pixel group at the location of the second pixel group using the second color value.

3. The method of claim 1, further comprising:
receiving an input representing a modification of the first set of attributes;
updating, in response to the input, the third color value based on the change; and
rendering, in the GUI, the isosurface pixel using the updated third color value.

4. The method of claim 3, further comprising storing the first set of attributes as an original first set of attributes in an electronic storage medium and prior to the modification of the first set of attributes.

5. The method of claim 4, further comprising:
receiving an input representing a request to revert the change of the first set of attributes;
retrieving, from the electronic storage medium, the original first set of attributes;
updating, in response to the input, the third color value based on the original first set of attributes; and
rendering, in the GUI, the isosurface pixel using the updated third color value.

6. The method of claim 1, further comprising rendering, in the GUI, at least a partial ring of pixels including the first color associated with the first set of attributes, the ring of pixels at least partially surrounding the location of the isosurface pixel.

7. The method of claim 1, further comprising generating the first pixel group based at least in part on a color of a plurality of pixels of an existing digital artwork.

8. A non-transitory computer readable medium having instructions encoded thereon that when executed by one or more computer processors cause the one or more computer processors to perform a process comprising:
assigning a first set of attributes to a first pixel group, the first set of attributes including a first reference coordinate point, a first color value, and a first size value, the first reference coordinate point defining a location of the first pixel group within an interactive palette interface (GUI), the first color value defining a color of the first pixel group, and the first size value defining a number of pixels included in the first pixel group;
assigning a second set of attributes to a second pixel group, the second set of attributes including a second reference coordinate point, a second color value, and a second size value, the second reference coordinate point defining a location of the second pixel group within the GUI, the second color value defining a color of the second pixel group, and the second size value defining a number of pixels included in the second pixel group;
calculating a third color value defining a color of an isosurface pixel at a third reference coordinate point, the isosurface pixel being contiguous with at least one of the pixels in the first and second pixel groups, the isosurface pixel being different from the pixels in the first and second pixel groups, the third color value being a parametric function of each of the first and second reference coordinate points, the first and second color values, and the first and second size values; and
rendering, in the GUI, the isosurface pixel at the third reference coordinate point using the third color value.

9. The non-transitory computer readable medium of claim 8, wherein the process further comprises rendering, in GUI, the first pixel group at the location of the first pixel group using the first color value, and rendering, in the GUI, the second pixel group at the location of the second pixel group using the second color value.

10. The non-transitory computer readable medium of claim 8, wherein the process further comprises:
receiving an input representing a modification of the first set of attributes;
updating, in response to the input, the third color value based on the change; and
rendering, in the GUI, the isosurface pixel using the updated third color value.

11. The non-transitory computer readable medium of claim 10, wherein the process further comprises storing the first set of attributes as an original first set of attributes in an electronic storage medium and prior to the modification of the first set of attributes.

12. The non-transitory computer readable medium of claim 11, wherein the process further comprises:
receiving an input representing a request to revert the change of the first set of attributes;
retrieving, from the electronic storage medium, the original first set of attributes;
updating, in response to the input, the third color value based on the original first set of attributes; and
rendering, in the GUI, the isosurface pixel using the updated third color value.

13. The non-transitory computer readable medium of claim 8, wherein the process further comprises rendering, in the GUI, at least a partial ring of pixels including the first color associated with the first set of attributes, the ring of pixels at least partially surrounding the location of the isosurface pixel.

14. The non-transitory computer readable medium of claim 8, wherein the process further comprises generating the first pixel group based at least in part on a color of a plurality of pixels of an existing digital artwork.

15. A system for converting mechanical markings on hardcopy textual content to digital annotations in a digital document file, the system comprising:
a storage; and
a processor operatively coupled to the storage, the processor configured to execute instructions stored in the storage that when executed cause the processor to carry out a process including
step for assigning a first set of attributes to a first pixel group, the first set of attributes including a first reference coordinate point, a first color value, and a first size value, the first reference coordinate point defining a location of the first pixel group within an interactive palette interface (GUI), the first color value defining a color of the first pixel group, and the first size value defining a number of pixels included in the first pixel group;
step for assigning a second set of attributes to a second pixel group, the second set of attributes including a second reference coordinate point, a second color value, and a second size value, the second reference coordinate point defining a location of the second pixel group within the GUI, the second color value defining a color of the second pixel group, and the second size value defining a number of pixels included in the second pixel group;
step for calculating a third color value defining a color of an isosurface pixel at a third reference coordinate point, the isosurface pixel being contiguous with at least one of the pixels in the first and second pixel groups, the isosurface pixel being different from the pixels in the first and second pixel groups, the third color value being a parametric function of each of the first and second reference coordinate points, the first and second color values, and the first and second size values; and rendering, in the GUI, the isosurface pixel at the third reference coordinate point using the third color value.

16. The system of claim 15, wherein the process further comprises rendering, in GUI, the first pixel group at the location of the first pixel group using the first color value, and rendering, in the GUI, the second pixel group at the location of the second pixel group using the second color value.

17. The system of claim 15, wherein the process further comprises:

receiving an input representing a modification of the first set of attributes;

step for updating, in response to the input, the third color value based on the change; and rendering, in the GUI, the isosurface pixel using the updated third color value.

18. The system of claim 17, wherein the process further comprises:

storing the first set of attributes as an original first set of attributes in an electronic storage medium and prior to the modification of the first set of attributes;

receiving an input representing a request to revert the change of the first set of attributes;

retrieving, from the electronic storage medium, the original first set of attributes;

updating, in response to the input, the third color value based on the original first set of attributes; and rendering, in the GUI, the isosurface pixel using the updated third color value.

19. The system of claim 15, wherein the process further comprises rendering, in the GUI, at least a partial ring of pixels including the first color associated with the first set of attributes, the ring of pixels at least partially surrounding the location of the isosurface pixel.

20. The system of claim 15, wherein the process further comprises a step for generating the first pixel group based at least in part on a color of a plurality of pixels of an existing digital artwork using an algorithm for sampling and clustering the pixels of the existing digital artwork.

* * * * *